United States Patent Office.

FREDERICK J. BERRY, OF BOSTON, MASSACHUSETTS, ASSIGNOR OF ONE-HALF TO JOSHUA W. CLAPP AND SMITH WRIGHT, OF SAME PLACE.

COMPOUND FOR RENOVATING BRICK SURFACES.

SPECIFICATION forming part of Letters Patent No. 248,011, dated October 11, 1881.

Application filed December 27, 1880. (Specimens.)

*To all whom it may concern:*

Be it known that I, FREDERICK JONATHAN BERRY, of Boston, county of Suffolk, State of Massachusetts, have invented a new, useful, and improved composition of matter to be used for restoring the surface of old and worn bricks to a new appearance, and to give a uniform appearance to old and new brick in the extension and repairs of new buildings, and a more durable and permanent color, and at a less cost than that usually obtained; and I do hereby declare that the following is a description sufficiently full, clear, and exact to enable any person skilled in the art or science to which my invention appertains to make and use the same.

The nature of my invention consists in the addition to the ordinary coloring-matter of Venetian red and French yellow ocher of pure carbonate of iron and red oxide of iron, to make a more durable, natural-looking, and lasting material, and the addition of creosote to kill the germs and prevent the growth of any animal or vegetable matter caused by dampness, that usually causes the discoloration of brick laid in mortar, as in buildings; and the substitution of glue, alum, and water as a vehicle of mixture, in place or lieu of oil, the whole compound being applied once only, instead of the customary two or three coatings usually necessary, and therefore applied at much saving of time and cost.

The compound consists of the following ingredients, and in the following proportions by weight: one part creosote; five parts frozen glue; ten parts carbonate of iron; ten parts red oxide of iron; fifteen parts French yellow ocher; thirty parts Venetian red; two parts ground alum; one hundred and twenty parts of common soft water.

To prepare my composition I take the aforenamed one hundred and twenty parts (or pounds) of water, (about fifteen gallons,) and, heating it, dissolve in separate vessels the required weights, respectively, of glue and alum. (I prefer frozen glue as being more readily soluble; but it is not essential that it be frozen.) I then mix together the glue-water and the alum-water, and add, successively, my different salts of iron above mentioned, stirring the whole thoroughly after each successive addition to make a perfect admixture. Lastly, I pour in my creosote, stirring the whole meanwhile. My composition is then ready for use, and may be used either cold or hot. In its application the composition should be well stirred from time to time as it is being used, to prevent the subsidence of the insoluble mineral ingredients. I then, with a common paint-brush, apply it to any and all exposed outside surfaces of brick walls, wherever it is desirable that a proper brick color should be restored and maintained. The advantages of the use of my composition have been stated in the preamble to this specification.

I do not claim any composition composed simply of glue, water, alum, and salts of iron.

I claim—

The composition hereinabove described, consisting of creosote, glue, carbonate of iron, red oxide of iron, French yellow ocher, Venetian red, ground alum, and water, all mixed in the proportions and adapted to the purpose substantially as described.

FREDERICK J. BERRY.

Attest:
GEO. Z. ADAMS,
SMITH WRIGHT.